United States Patent
Sayeedi et al.

(10) Patent No.: US 7,668,141 B2
(45) Date of Patent: Feb. 23, 2010

(54) METHOD AND APPARATUS FOR MANAGING PACKET DATA LOSS IN A WIRELESS NETWORK

(75) Inventors: Shahab M. Sayeedi, Naperville, IL (US); Anda M. Farcasanu, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 1233 days.

(21) Appl. No.: 11/141,922

(22) Filed: Jun. 1, 2005

(65) Prior Publication Data

US 2006/0007862 A1    Jan. 12, 2006

Related U.S. Application Data

(60) Provisional application No. 60/585,608, filed on Jul. 6, 2004.

(51) Int. Cl.
*H04Q 7/00* (2006.01)
(52) U.S. Cl. .................. 370/331; 370/349
(58) Field of Classification Search .......... 370/310, 370/310.2, 329, 331, 332, 338, 349; 455/439
See application file for complete search history.

(56) References Cited

U.S. PATENT DOCUMENTS

| | | | |
|---|---|---|---|
| 5,719,853 A | 2/1998 | Ikeda | |
| 6,795,450 B1 * | 9/2004 | Mills et al. | 370/463 |
| 7,574,226 B2 * | 8/2009 | Takano et al. | 455/517 |
| 2002/0160812 A1 | 10/2002 | Moshiri-Tafreshi et al. | |
| 2002/0196743 A1 | 12/2002 | Thalanany et al. | |
| 2003/0171117 A1 | 9/2003 | Wang et al. | |
| 2005/0259687 A1 | 11/2005 | Abrol et al. | |
| 2005/0265304 A1 | 12/2005 | Kim et al. | |

FOREIGN PATENT DOCUMENTS

| | | |
|---|---|---|
| EP | 0 374 928 A2 | 6/1990 |
| EP | 1 056 301 A2 | 11/2000 |
| EP | 1 324 551 A | 7/2003 |
| EP | 1 353 483 A | 10/2003 |
| WO | WO 97-22196 A1 | 6/1997 |

OTHER PUBLICATIONS

Suchita Varma, "Canadian 1st Office Action," Canadian Intellectual Property Office, Nov. 6, 2006.

(Continued)

*Primary Examiner*—Brenda Pham

(57) ABSTRACT

Various embodiments are described to address the need for more effective management of packet data loss in wireless communication systems. When a packet data destination (131) that is receiving a flow of packets for a packet data service instance indicates to the packet data source (141) of the flow that the flow should be suspended, it also indicates to the source how to process packets for the service instance while the flow transmission is suspended. For example, the packet data destination may indicate an event or condition that is triggering the flow suspension, the source can then begin buffering packets, discarding packets, starting timers, and/or taking other packet processing actions to manage packet data loss in view of the packet data destination's indication. Alternatively, the packet data destination may explicitly indicate the packet processing actions the source should take while the packet flow is suspended.

25 Claims, 6 Drawing Sheets

OTHER PUBLICATIONS

Suchita Varma, "Canadian 2nd Office Action," Canadian Intellectual Property Office, Aug. 13, 2008.

"1st Chinese Office Action," The State Intellectual Property Office of the People's Republic of China, Jul. 18, 2008.

G. Schrembs, "European Search Report," European Patent Office, Munich, Germany, Oct. 18, 2005.

G. Schrembs, "European 1st Office Action," European Patent Office, Munich, Germany, Aug. 7, 2006.

N. Sinha, "India 1st Examination Report," Government of India, The Patent Office, Salt Lake City, India, Dec. 23, 2008.

"Japan 1st Office Action" Japanese Patent Office, Jan. 22, 2008.

Shin Seong Gil, "Preliminary Rejection" Korean Intellectual Property Office, Daejeon, Republic of Korea, Aug. 31, 2006.

Koj Omae et al., "Effectiveness of Packet Buffering at Mobility Anchor Points," IEIC Technical Report, Institute of Electronics, Information and Communication Engineers, vol. 103, No. 198, 2003, pp. 53-58.

* cited by examiner

METHOD AND APPARATUS FOR MANAGING PACKET DATA LOSS IN A WIRELESS NETWORK

REFERENCE(S) TO RELATED APPLICATION(S)

The present application claims priority from provisional application, Ser. No. 60/585,608, entitled "METHOD AND APPARATUS FOR MANAGING PACKET DATA LOSS IN A WIRELESS NETWORK," filed Jul. 6, 2004, which is commonly owned and incorporated herein by reference in its entirety.

This application is related to a co-pending application, Ser. No. 10/158,722, entitled "APPARATUS AND METHOD FOR ENHANCING PERFORMANCE IN A PACKET DATA SYSTEM," filed May 30, 2002, which is assigned to the assignee of the present application.

FIELD OF THE INVENTION

The present invention relates generally to wireless communication systems and, in particular, to managing packet data loss in wireless communication systems.

BACKGROUND OF THE INVENTION

In CDMA2000 radio access networks (RANs), such as (Third Generation Partnership Project 2 (3GPP2) 3G1x, 1xEV-DO, and 1xEV-DV, packets targeted for mobiles that are sent from the packet data network may be dropped or lost when certain events occur in the RAN. These events include: hard handoffs, Voice Precedence Over Packet (VPOP) situations, 1xEV-DO-A cross paging circuit notifications, mobile paging failures, and buffer overflows in the RAN.

A packet data hard handoff can take several seconds to complete. Inter-PCF (packet control function) hard handoffs may result in an intra-PDSN (packet data serving node) or inter-PDSN hard handoff. Intra-PDSN hard handoffs result in the target PCF connecting back to the source PDSN supporting the packet data when the target PCF has connectivity to the source PDSN. Inter-PDSN handoffs result in a new PDSN being assigned to the mobile's packet data session when the PCF doesn't have connectivity to the source PDSN or the source PDSN is busy. The network may initiate a 'fast handoff' when an inter-PDSN hard handoff is required allowing the mobile to delay PPP reconnection/MIP procedures until the packet data session goes dormant. Regardless what type of hard handoff occurs, data targeting the mobile is dropped at the source PCF until the mobile establishes a connection with the target PDSN.

In the case of VPOP and 1xEV-DO-A cross paging circuit notifications, the mobile's active packet data session is transitioned to the dormant state allowing the network to terminate a circuit voice call to a hybrid 1xEV-DO mobile. However, the PDSN continues delivering data for the mobile to the RAN even though the packets can no longer be delivered to the mobile. Furthermore, the RAN may try to re-initiate the packet data session with the mobile as packets destined for the mobile arrive from the IP network.

When the network tries to initiate a packet session (e.g., a packet data call reactivation or a network initiated packet data session), paging may be involved. If the mobile fails to respond to the page, packet data accumulates, potentially flooding the PCF and/or BS buffers. Even without a paging failure, RAN buffers may overflow for reasons such as a poor RF conditions. 3GPP2 standards support a simple Xon/Xoff flow control procedure between a PCF and PDSN. The PCF may request a PDSN to stop and start the transmission of packets to the RAN. However, in the current art, the flow control signaling does not prevent the loss of packets altogether. Internet Engineering Task Force (IETF) RFC 793, which defines the transmission control protocol (TCP), also provides flow control services between data connection termination points, but in TCP lost data is interpreted as congestion and an exponential reduction of data throughput can thereby result. This, of course, further degrades packet data performance. Therefore, a need exists for an apparatus and method of more effectively managing packet data loss in wireless communication systems.

DETAILED DESCRIPTION OF EMBODIMENTS

Various embodiments are described to address the need for more effective management of packet data loss in wireless communication systems. When a packet data destination that is receiving a flow of packets for a packet data service instance indicates to the packet data source of the flow that the flow should be suspended, it also indicates to the source how to process packets for the service instance while the flow transmission is suspended. For example, the packet data destination may indicate an event or condition that is triggering the flow suspension, the source can then begin buffering packets, discarding packets, starting timers, and/or taking other packet processing actions to manage packet data loss in view of the packet data destination's indication. Alternatively, the packet data destination may explicitly indicate the packet processing actions the source should take while the packet flow is suspended.

Figure 1:
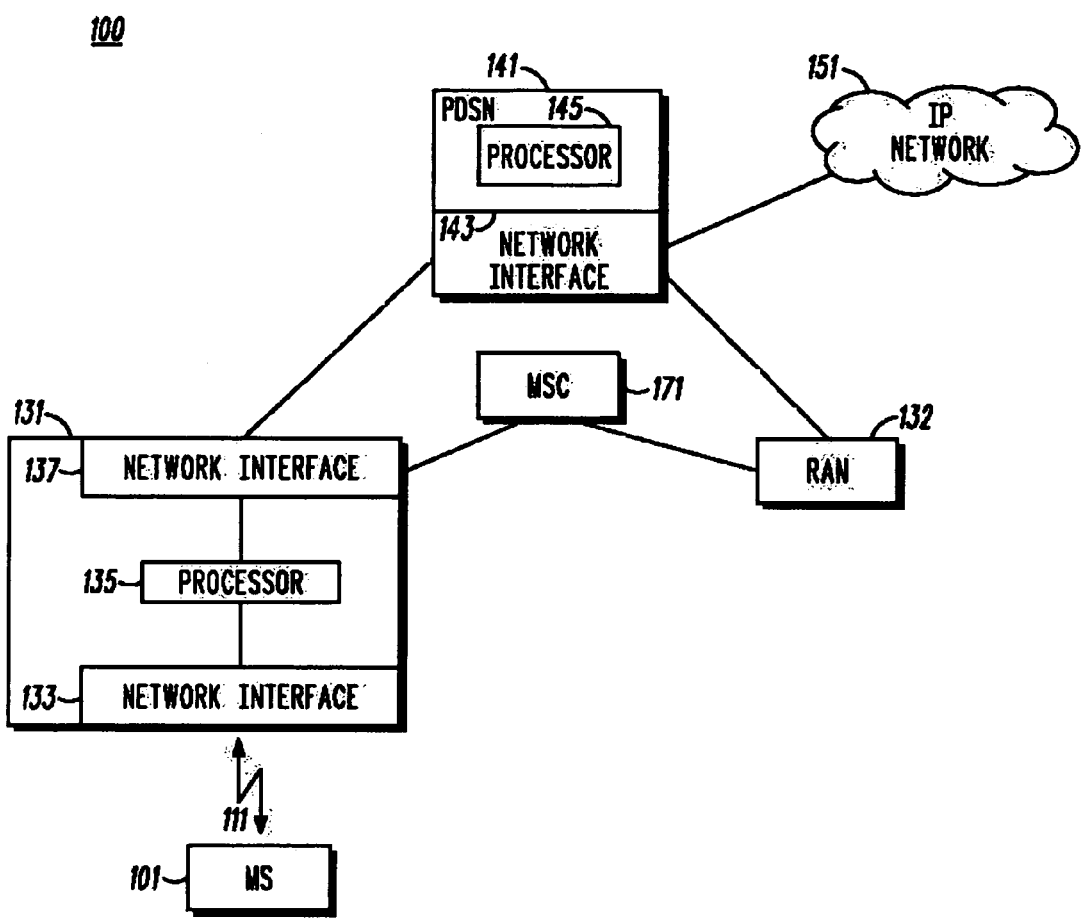
FIG. 1 is a block diagram depiction of a wireless communication system in accordance with multiple embodiments of the present invention.

The disclosed embodiments can be more fully understood with reference to FIGS. 1-6. FIG. 1 is a block diagram depiction of a wireless communication system 100 in accordance with multiple embodiments of the present invention. Communication system 100 is a well-known Code Division Multiple Access (CDMA) system, specifically a CDMA2000 system, which is based on the "3GPP2 Interoperability Specification (IOS) for CDMA 2000 Access Network Interfaces" and "Upper Layer (Layer 3) Signaling Standard for cdma2000 Spread Spectrum Systems" standards, suitably modified to implement the present invention. Alternative embodiments of the present invention may be implemented in communication systems that employ other technologies such as, but not limited to, IS-136, IS-95, IS-833, 1xEV-DO, 1xEV-DV, "iDEN," "WiDEN," GSM, GPRS, EDGE, 3GPP UMTS, and the IEEE's 802.11, 802.16, and 802.20.

Those skilled in the art will recognize that FIG. 1 does not depict all of the network equipment necessary for system 100 to operate but only those system components and logical entities particularly relevant to the description of embodiments of the present invention. In particular, the network equipment of system 100 comprises components such as radio access networks (RANs) 131 and 132, mobile switching center (MSC) 171, packet data serving node (PDSN) 141, and internet protocol (IP) network 151. Generally, RANs, BSs, PCFs, PDSNs, MSCs, and IP networks are known in the art. For example, RANs are well-known to comprise components such as processors, network interfaces, and wireless interfaces, and PDSNs are well-known to comprise components such as processors and network interfaces. Also, RANs are known in the art to typically comprise component devices such as packet control functions (PCFs) and base stations (BSs), and BSs are well-known to comprise components such as base station controllers (BSCs) and base transceiver systems (BTSs), neither of which are specifically shown in FIG. 1.

RAN 131 and PDSN 141 are depicted in FIG. 1 as comprising processors 135 and 145, network interfaces 137 and 143, and (for RAN 131) wireless interface 133. In general, components such as processors and network/wireless interfaces are well-known. For example, processors are known to comprise basic components such as, but not limited to, microprocessors, microcontrollers, memory devices, and/or logic circuitry. Such components are typically adapted to implement algorithms and/or protocols that have been expressed using high-level design languages or descriptions, expressed using computer instructions, expressed using messaging flow diagrams, expressed using call flow diagrams, and/or expressed using logic flow diagrams. Thus, given an algorithm, a logic flow, a messaging flow, a call flow, and/or a protocol specification, those skilled in the art are aware of the many design and development techniques available to implement a RAN and/or PDSN that performs the given logic. Therefore, RAN 131 and PDSN 141 represent a known RAN and PDSN that have been adapted, in accordance with the description herein, to implement multiple embodiments of the present invention.

RAN 131 uses an air interface 111 for communication with remote unit 101. IS-2000 terminology refers to remote units as mobile stations (MSs); however, remote units are not necessarily mobile or able to move. Thus, remote unit/MS platforms are known in the art to include devices such as mobile phones, computers, personal digital assistants, gaming devices, etc. In particular, MS 101 comprises component devices (none shown) such as a processor and a transceiver, both well-known in the art.

Operation of embodiments in accordance with the present invention occurs substantially as follows. As depicted in FIG. 1, PDSN 141 and RAN 131 represent a packet data source and destination, respectively. However, these designations are merely exemplary for the purposes of discussion. A packet data source could instead be represented by system components such as, but not limited to, a RAN, a PCF or a BS. In addition, a packet data destination could instead be represented by system components such as, but not limited to, a PCF, a BS or an MS. PDSN processor 145 transmits via network interface 143 a flow of packets for a packet data service instance to RAN 131. RAN processor 135, via RAN network interface 137, receives the packet flow and forwards packets from the flow to MS 101 via RAN wireless interface 133.

A situation may arise, however, where RAN processor 135 determines that it is no longer able to successfully forward packets from the flow of packets to MS 101. Conditions (e.g., events) such as a RAN buffer overflow (due to congestion, poor RF conditions, etc.), a handoff, a packet data paging failure, and/or a preemption of packet data service by a circuit service may make forwarding packets to MS 101 difficult (perhaps QoS parameters for the session cannot be met) or impossible for RAN 131. In response to determining that it is no longer able to successfully forward packets to MS 101 for the packet data service instance, RAN processor 135 transmits to PDSN 141, via RAN network interface 137, an indication to suspend transmitting the flow of packets for the packet data service instance. For example, the indication to suspend may include explicit flow control signaling such as a transmit off (XOFF). Also, in response to determining that it is no longer able to successfully forward packets to MS 101 for the packet data service instance, RAN processor 135 transmits to PDSN 141, via RAN network interface 137, an indication of how to process packets for the packet data service instance while the flow transmission is suspended. For an example of how these indications may be conveyed, FIG. 2 is discussed below.

Figure 2:
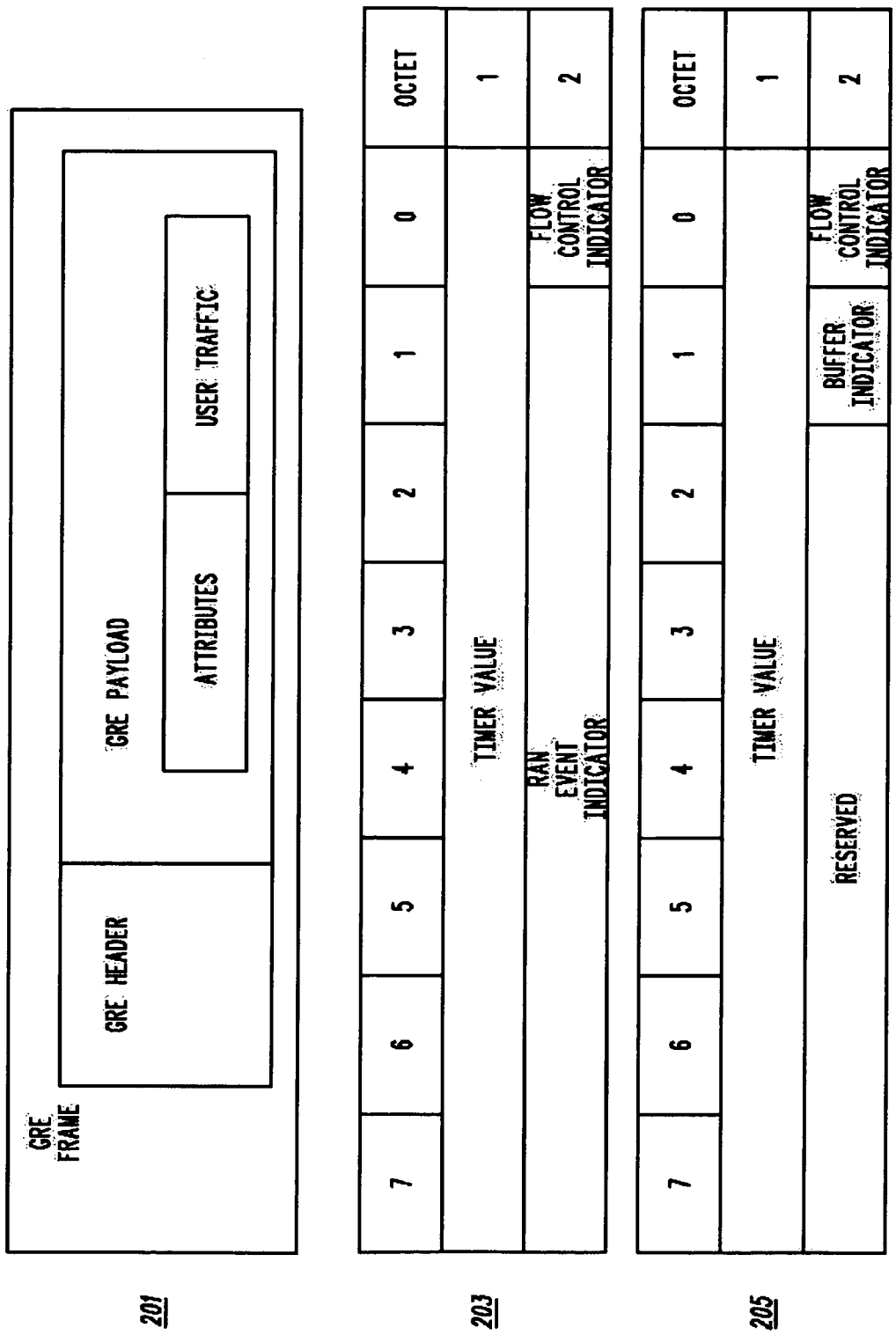
FIG. 2 is a block diagram conveying bit definitions for Generic Routing Encapsulation (GRE) messaging in accordance with multiple embodiments of the present invention.

FIG. 2 is a block diagram conveying bit definitions for Generic Routing Encapsulation (GRE) messaging in accordance with multiple embodiments of the present invention. Today, flow control is requested by a RAN by including flow controls signals in GRE frames sent over the A10 interface to the PDSN. (This assumes that flow control for this particular packet data service instance has been enabled by the PDSN over the A11 signaling interface.) An A10 connection and an A8 connection are used for the transport of user data for a packet data session. With an A10 connection and an A8 connection in place, link layer/network layer packets pass over these connections in both directions between the RAN and the PDSN using GRE framing. Block 201 generically represents a GRE frame.

In general, the indication of how to process packets for the packet data service instance while the flow transmission is suspended may be conveyed by indicating that a condition is present at the packet data destination or, alternatively, the indication may be conveyed by signaling that provides explicit packet processing instructions for the packet data source. Examples of conditions at the packet data destination that may be conveyed include a buffer-overflow-discard-packets condition, a packet-data-paging-failure-discard-packets condition, a Voice Precedence Over Packet (VPOP) condition, a 1xEV-DO Circuit Services Notification condition, a preemption of packet data service by a circuit service condition, a buffer-overflow-hold-packets condition, a handoff in-progress condition, and a packet-data-paging-failure-hold-packets condition.

Alternatively, examples of the more explicit packet processing instructions for the packet data source include an instruction to buffer packets for the packet data service instance while the flow transmission is suspended, an instruction to buffer packets for the packet data service instance for an indicated period of time while the flow transmission is suspended (a timer value for a packet data source buffering period is indicated), an instruction to discard packets for the packet data service instance while the flow transmission is suspended, and an instruction to resume flow transmission for the packet data service instance after an indicated period of time (a timer value for a packet data source transmission suspension period is indicated).

Blocks 203 and 205 depict examples of these two alternative approaches to conveying the indication of how to process packets during flow suspension. Each may be conveyed in the attributes portion of GRE frame 201. Both messaging blocks 203 and 205 contain a flow control indicator bit which may be coded as follows:

"1" represents "XOFF"
PDSN stops sending data to the RAN (PCF) for the A10 connection identified.
"0" represents "XON"
If the PDSN has data available, it resumes data transmission to the RAN (PCF) for the A10 connection identified.

Both messaging blocks 203 and 205 contain a timer value byte which may be coded as follows:

"00000000" represents no timer
"00000001"-"11111111" represents a timer (0.1-25.6 seconds)
This field may be included by the RAN (PCF) when the XOFF signal is sent. If included, the PDSN buffers packets for the period specified by this timer if possible (i.e., while buffer space is available at the PDSN). The granularity of the timer is 0.1 seconds.

Messaging block 203 contains a RAN event indicator field which may be coded as follows:

"0000000"
No condition information included—Set when XON Flow Control Indicator is set or event information is not available or not sent. If Flow Control Indicator is set to XOFF and event information is not included, the PDSN shall discard the packets.
"0000001"
Buffer-overflow-hold-packets condition—PDSN buffers data for a packet data connection.
"0000010"
Buffer-overflow-discard-packets condition—PDSN discards the packets.
"0000011"
Hard Handoff (HHO) in Progress condition—PDSN buffers packets. Packets are buffered until the HHO completes or the period specified by the timer value or the PDSN's HHO event timer expires.
"0000100",
Packet-data-paging-failure-hold-packets condition— PDSN buffers packets.
"000010"
Packet-data-paging-failure-discard-packets condition— PDSN discards packets.
"0000110"
Voice Precedence Over Packet (VPOP) condition—PDSN discards packets.
"0000111"
1xEV-DO Circuit Services Notification condition—PDSN discards packets.
"0001000"-"1111111"
Reserved for future RAN event definitions.

Messaging block 205 contains a buffer indicator bit. This bit indicates whether the PDSN should buffer or drop packets when an XOFF signal is sent and may be coded as follows:

"1"
PDSN should drop packets for the connection.
"0"
PDSN should buffer packets for the connection.

Thus, messaging blocks 203 and 205 depict examples of two alternative approaches to conveying the indication of how to process packets during flow suspension. Messaging block 203 depicts an approach where the condition present at the RAN is conveyed along with the suspend indication, while messaging block 205 depicts an approach where an explicit indication of whether to buffer or not is conveyed along with the suspend indication. Also, both messaging blocks 203 and 205 provide a timer value field for indicating a buffering period (after which the buffered packets may either be discarded or transmitted as the flow transmission resumes).

Again returning to FIG. 1, in response to determining that it is no longer able to successfully forward packets to MS 101 for the packet data service instance, RAN 131 transmits to PDSN 141 an indication to suspend transmission and an indication of how to process packets for the packet data service instance while the flow transmission is suspended. PDSN processor 145 receives these indications via network interface 143 and, in response, suspends the packet flow transmission. PDSN processor 145 then proceeds to either buffer or discard packets for the packet data service instance while the flow transmission is suspended. If a timer value for a packet data source buffering period is indicated, PDSN processor 145 buffers packets for the timer period and then discards the packets unless the flow transmission has resumed in the interim. If a timer value for a packet data source transmission suspension period is indicated, PDSN processor 145 buffers packets during the timer period and then resumes the transmission flow of packets, including packets buffered, when the period ends.

If a RAN condition (e.g., a RAN event) is indicated by RAN 131, instead of an explicit buffer/discard indication, PDSN processor 145 processes packets for the packet data service instance based on the RAN condition. For example, PDSN processor 145 discards packets for the service instance while flow transmission is suspended when the condition indicated is a buffer-overflow-discard-packets condition, a packet-data-paging-failure-discard-packets condition, or a preemption of packet data service by a circuit service condition. VPOP and 1xEV-DO Circuit Services Notification events are examples of events that result in a condition in which the packet data service is preempted by a circuit service. A RAN buffer overflow or a packet data paging failure that occurs for a service that readily recovers from lost packets are events that may result in a buffer-overflow-discard-packets or a packet-data-paging-failure-discard-packets condition, respectively. Note that the discarding of packets by PDSN processor 145 also preferably causes these packets to not be counted for user payment purposes.

Instead, PDSN processor 145 buffers packets for the service instance while flow transmission is suspended when the condition indicated is a buffer-overflow-hold-packets condition, a handoff in-progress condition, and a packet-data-paging-failure-hold-packets condition. A RAN buffer overflow or a packet data paging failure that occurs for a service that is not tolerant of lost packets are events that may result in a buffer-overflow-hold-packets or a packet-data-paging-failure-hold-packets condition, respectively. Furthermore, a handoff in-progress condition may result when MS 101 becomes involved in a hard handoff.

When RAN 131 (or in the case of an inter-RAN handoff, RAN 132, for example) is ready to receive the packet flow for the packet data service instance, an indication to resume transmitting the flow of packets is sent to PDSN 141. The indication to resume may be explicit, such as transmit on (XON) flow control signaling, or more implicit, such as signaling that indicates a handoff has completed or a expiration of a timer. In the case, that PDSN processor 145 is buffering packets for the service instance when the resume indication is received, PDSN processor 145 resumes transmitting the flow of packets for the packet data service instance, including packets that have been buffered.

Figure 3:
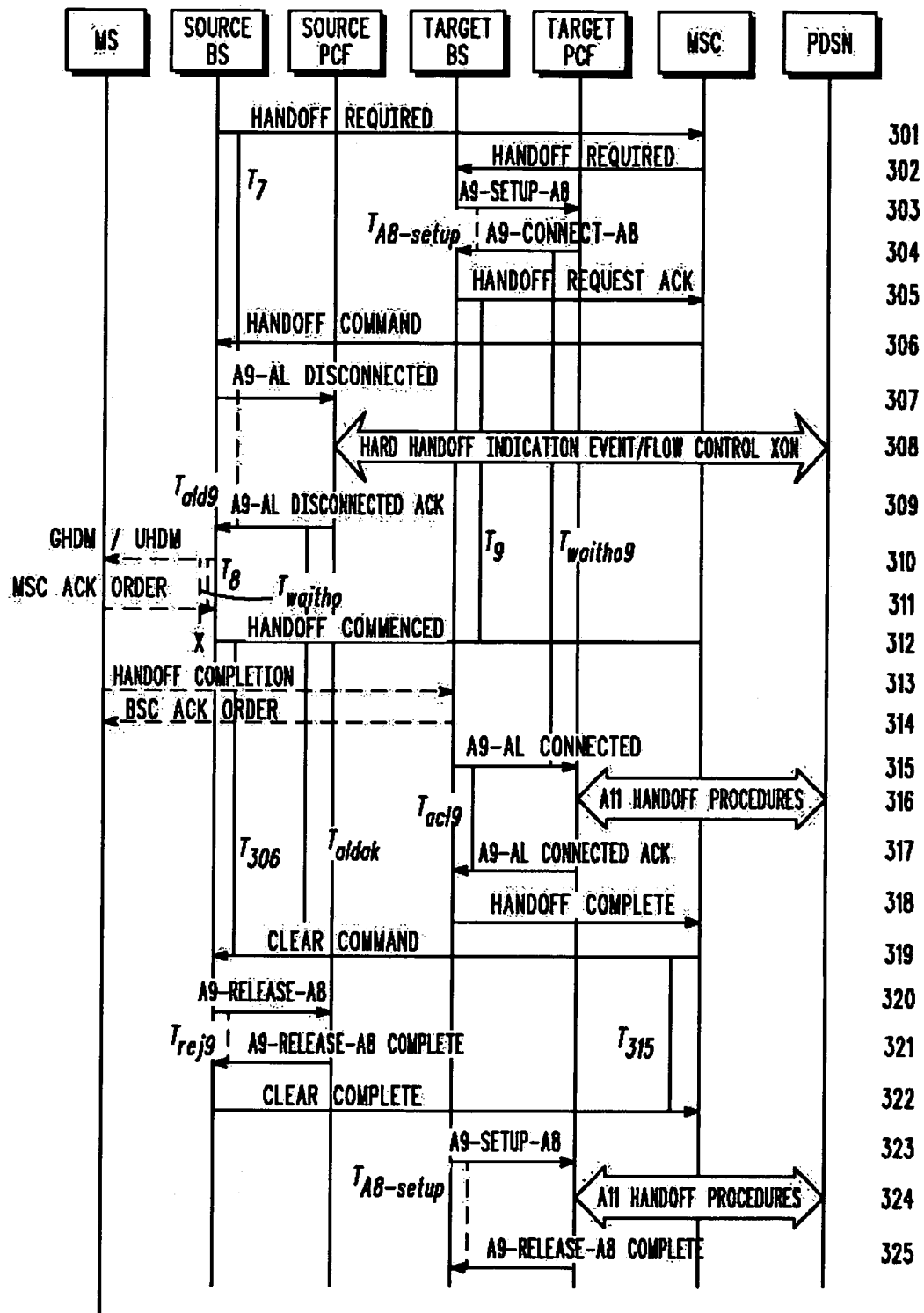
FIG. 3 is an exemplary call flow diagram depicting a hard handoff by an MS involved in a packet data call to another CDMA2000 BS, in accordance with multiple embodiments of the present invention.

FIG. 3 is an exemplary call flow diagram 300 depicting a hard handoff by an MS involved in a packet data call to another CDMA2000 BS, in accordance with multiple embodiments of the present invention. Embodiments of the present invention can reduce the loss of packet data during intra-PDSN packet data hard handoffs, one of the most common types of hard handoff in wireless systems. In certain embodiments, when a packet data hard handoff is required, the RAN passes a hard handoff event indication and a flow control XOFF signal to the PDSN requesting the PDSN to stop sending data to the RAN for the mobile's packet data service instances. Upon reception of these signals from the RAN, PDSN stops sending packets to the RAN and begins to buffer them. PDSN continues buffering data for the mobile until either the target PCF initiates contact with the PDSN to establish a new RP connection for the mobile's session or a PDSN HHO timer expires. If the PDSN HHO timer expires prior to the expected follow up event (e.g., the mobile arriving at the target RAN), the PDSN stops buffering packets and discards the buffered data.

Call flow diagram 300 applies to 3GPP2 IOS based RANs. Similar changes would apply to 1xEV-DO/HRPD IOS based RANs (A.S0008, A.S0009). Call flow diagram 300 provides an illustration for a successful intra-PDSN hard handoff event in a CDMA2000 system during packet data services. In this scenario, it is assumed that the source and target PCF are both served by the same PDSN. To simplify the diagram, it is assumed that for purposes of this example, the packet call is not in inter-BS softsofter handoff prior to the handoff and that no other service options are connected. This call flow shows the case of hard handoff without fast handoff.

The following is a detailed description of each call flow step as labeled on the rightmost column of FIG. 3:

301. Based on an MS report that it crossed a network specified threshold for signal strength, changes to a different ANID or for other reasons, the source BS recommends CDMA2000 to CDMA2000 hard handoff to one or more cells in the domain of the target BS. The source BS sends a Handoff Required message with the list of cells to the MSC and starts timer $T_7$. The source BS includes the ANID information of the source PCF in the Handoff Required message. The Service Configuration Record in this message identifies the active packet data service instances. The Service Option List information element identifies all packet data service instances of the MS (both active and dormant).

302. The MSC sends a Handoff Request message (which includes the ANID information previously communicated to the MSC via the Handoff Required message) to the target BS. The Service Configuration Record in this message identifies the active packet data service instances. The Service Option List information element identifies all packet data service instances of the MS (both active and dormant). Note that the target BS determines which packet data service instances are dormant by comparing this list with the list of active service options in the Service Configuration Record.

303. For each active packet data service instance, the target BS sends an A9-Setup-A8 message to the target PCF to establish the A8 connection and starts timer $T_{A8-setup}$. In this case, the handoff indicator field of the A9-Setup-A8 message is set to '1' (during handoff).

304. Upon receipt of each A9-Setup-A8 message from the target BS, the target PCF establishes the A8 connection. At this point of time, the PDSN continues to forward packet data to the source BS via source PCF. (i.e., the target BS and target PCF don't receive packet data from the PDSN.) The target PCF sends the A9-Connect-A8 message and starts timer $T_{waitho9}$. When the target BS receives the A9-Connect-A8 message it stops timer $T_{A8-setup}$. The establishment of the A10 connection is not performed because the handoff indicator field of the A9-Setup-A8 message is set to '1' (during handoff).

305. The target BS sends a Handoff Request Acknowledgment message to the MSC. The target BS starts timer $T_9$ to wait for the arrival of the MS on its radio channel.

306. The MSC prepares to switch the MS from the source BS to the target BS and sends a Handoff Command message to the source BS. The source BS stops timer $T_7$.

307. The source BS sends an A9-AL Disconnected message to the PCF to indicate that the air link is being disconnected due to a hard handoff. At this point of time, the source BS starts timer $T_{ald9}$.

308. In response to an indication from the BS that a hard handoff has been initiated, the PCF requests the PDSN to stop transmission of GRE packets with an indication that a hard handoff is in progress. The PDSN stops transmission of GRE packets to the source PCF and begins to buffer the unsent packets for the mobile.

309. Upon completion of transmission of any buffered packets for the mobile to the BS the PCF sends the A9-AL Disconnected Ack message as a response to the A9-AL Disconnected message. The BS stops timer $T_{ald9}$.

310. The source BS sends the General Handoff Direction Message or Universal Handoff Direction Message to the MS and starts timer $T_8$. If the MS is allowed to return to the source BS, then timer $T_{waitho}$ is started by the source BS.

311. The MS may acknowledge the General Handoff Direction Message or Universal Handoff Direction Message by sending an MS Ack Order to the source BS. The source BS stops timer $T_8$ upon receipt of this message. If the General Handoff Direction Message or Universal Handoff Direction Message is sent using quick repeats, the source BS might not request an acknowledgment from the MS.

312. The source BS sends a Handoff Commenced message to the MSC to notify it that the MS has been ordered to move to the target BS channel. The source BS starts timer $T_{306}$ to await the Clear Command message from the MSC. If timer $T_{waitho}$ has been started, the source BS shall wait for that timer to expire before sending the Handoff Commenced message.

313. The MS sends a Handoff Completion Message to the target BS.

The target BS detects that the MS has successfully accessed the target BS and stops timer $T_9$. However, if timer $T_9$ expires before the target BS detects that the MS has successfully accessed the target BS, the target BS shall send a Handoff Failure message to the MSC.

314. The target BS sends the BS Ack Order to the MS over the air interface.

315. Upon the receipt of the Handoff Completion message from the MS, the target BS sends an A9-AL Connected message, including the ANID received previously in the Handoff Request message, to the target PCF and starts timer $T_{alc9}$. The target PCF stops timer $T_{waitho9}$.

316. The target PCF establishes the A10 links associated with the packet data active service instances and the PDSN disconnects the old A10 links.

317. The target PCF sends the A9-AL Connected Ack message in response to the A9-AL Connected message and stops timer $T_{alc9}$. If timer $T_{alc9}$ expires, the target BS may resend the A9-AL Connect message. The PDSN resumes transmission of GRE packet data for the mobile including any buffered packets.

318. The target BS sends a Handoff Complete message to the MSC to indicate that the handoff was successfully completed.

319. The MSC sends a Clear Command message to the source BS and starts timer $T_{315}$. The source BS stops timer $T_{306}$.

320. For each A8 connection, the source BS sends an A9-Release-A8 message to the source PCF to release the A8 connection and starts timer $T_{re19}$.

321. Upon the receipt of each A9-Release-A8 message from the source BS, the source PCF releases the A8 connection and responds with an A9-Release-A8 Complete message. When the source BS receives the A9-Release-A8 Complete message it stops timer $T_{re19}$.

322. The source BS sends a Clear Complete message to the MSC to notify it that clearing has been accomplished. The MSC stops timer $T_{315}$. This step may occur any time after the traffic channel is released.

323. For each dormant packet data service instance (if any), the target BS sends an A9-Setup-A8 message to the PDSN with Data Ready Indicator set to '0' and starts an associated timer $T_{A8\text{-}setup}$. Steps 322-325 may occur any time after step 309.

324. The target PCF establishes the A10 links associated with the dormant packet data service instances and the PDSN disconnects the old A10 links.

325. The target PCF sends an A9-Release-A8-Complete message as a response to each A9-Setup-A8 message. The BS stops the $T_{A8\text{-}setup}$ timer associated with each A9-Setup-A8 message.

Figure 4:
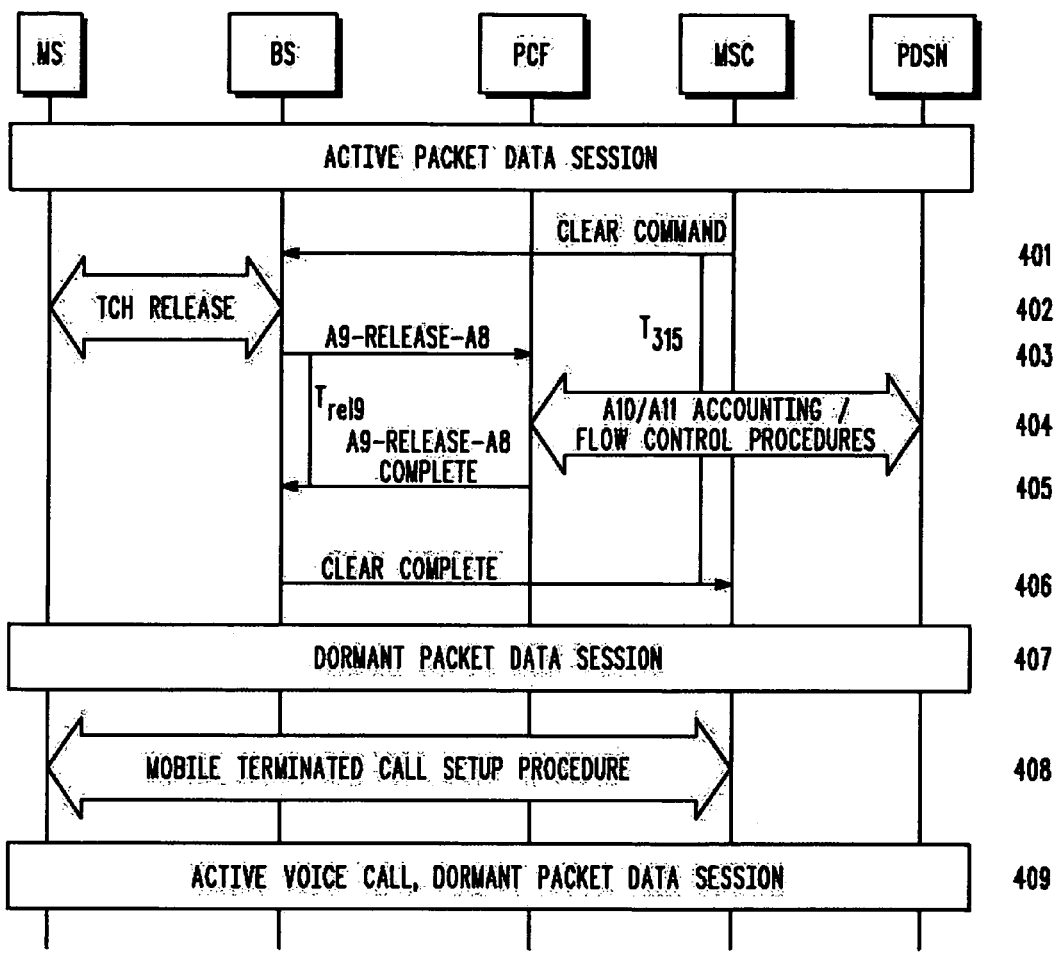
FIG. 4 is an exemplary call flow diagram depicting a Voice Preference Over Packet (VPOP) preemption of an MS involved in an active packet data session, in accordance with multiple embodiments of the present invention.

FIG. 4 is an exemplary call flow diagram 400 depicting a Voice Preference Over Packet (VPOP) preemption of an MS involved in an active packet data session, in accordance with multiple embodiments of the present invention. In certain embodiments, when the RAN requests flow control from the PDSN, the RAN provides an event indication to the PDSN with the XOFF flow control signal. For VPOP and DO-A X-Paging, the RAN includes a 'back-off' timer to prevent the PDSN from sending packets to the RAN for a period of time to prevent reactivation of the packet data session or initiation of a new one. An additional buffering timer may also be included if packets are buffered during periods of RAN congestion based on QoS or other call requirements. The additional event and timer information allows the PDSN to provide improved treatment to undelivered packets and the packet data connection.

For VPOP, DO-rev. 01× page notification, and DO-rev. A X-paging, the RAN sends a VPOP or circuit services notification event to PDSN, flow control XOFF signal, and a circuit services timer (such as a transmission suspension timer). The PDSN stops sending packets to the RAN, and the RAN shall not trigger a network initiated packet data call (by sending packets to the RAN) until a flow control XON signal is received from the RAN for the session or the circuit services timer expires.

Call flow diagram 400 illustrates a case where an MS has an active packet data session when an incoming voice call needs to be delivered to the MS. It is assumed that the mobile user is subscribed to and has activated the VPOP feature. The following is a detailed description of each call flow step/event as labeled on the rightmost column of FIG. 4:

401. The MSC receives indication of an incoming voice call. The MSC determines that the MS is on an active packet data call. The MSC determines that the user has subscribed to and activated the VPOP feature and sends a Clear Command message to the BS with Cause IE set to '10H packet call going dormant', instructing the BS to release the associated dedicated resource. The MSC starts timer $T_{315}$.

402. Upon receiving the Clear Command message with Cause IE set to '10H Packet Call going Dormant' the BS signals to the MS to remain in the Dormant State after the traffic channel is released (e.g., by using the Service Option Control Message or Retry Order) and initiates traffic channel release.

403. For each active packet data service instance the BS sends an associated A9-Release-A8 message, with a cause value set to "Packet call going dormant", to the PCF to instruct the PCF to release the associated dedicated resources, and starts timer $T_{re19}$. Note that in this scenario the A10 connection is not released. If the network attempts to reactivate the packet data session, normal procedures for network initiated packet data reactivation attempt while the MS is busy take place.

404. The A11 accounting update procedures take place. The PCF sends the 'All Dormant Indicator' to the PDSN. Any P-P connections that may exist to an anchor PDSN are released. Flow Control XOFF with VPOP condition indication is sent to the PDSN in a GRE packet for each packet data service instance. A timer value may also be included. The PDSN stops sending packets to the PCF for each packet data service instance until an XON is received, or a circuit services timer expires at the PDSN.

405. The PCF acknowledges each A9-Release-A8 message by returning an A9-Release-A8 Complete message. The BS stops timer $T_{re19}$.

406. The BS returns a Clear Complete message to the MSC. The MSC releases the underlying transport connection and stops timer $T_{315}$. This step may occur any time after the traffic channel is released.

407. At this point the packet data session is considered to be in the Dormant State.

408. The MSC uses normal mobile termination call setup procedure for delivering the call to the MS.

409. At this point the voice call is active and the packet data session is in Dormant State.

Figure 5:
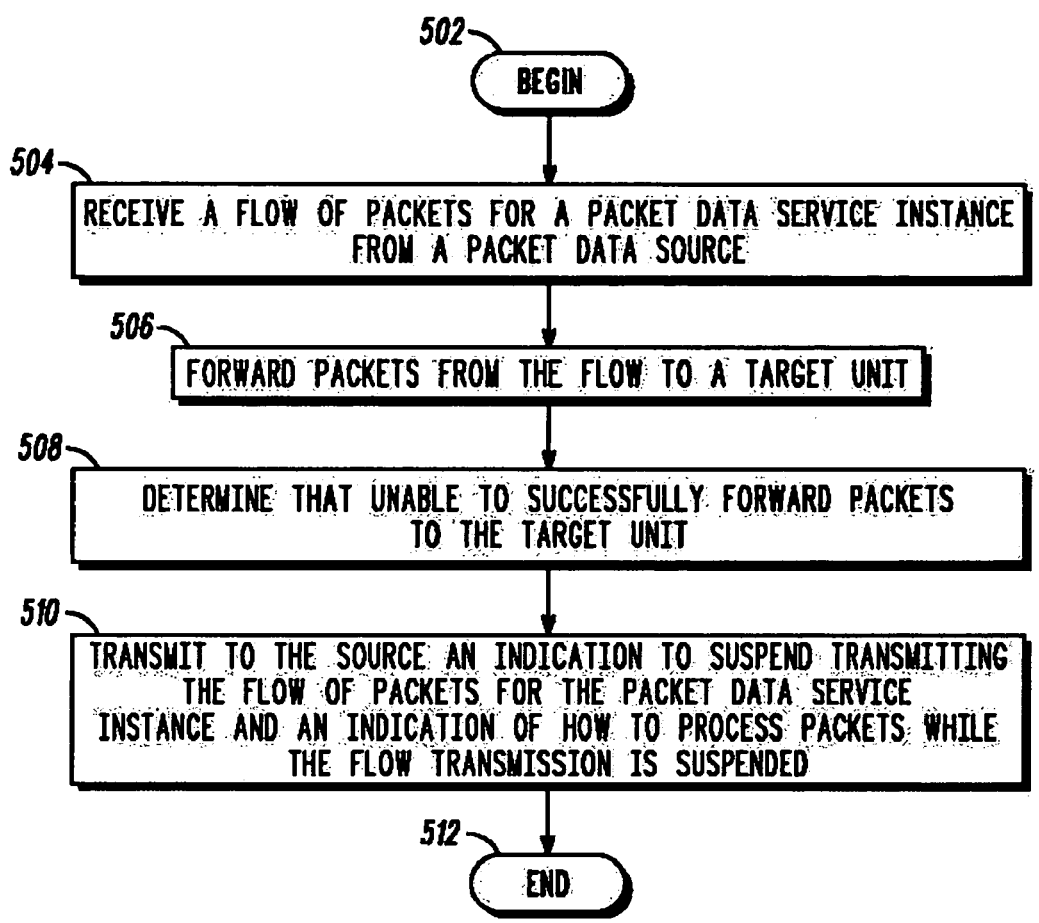
FIG. 5 is a logic flow diagram of functionality performed by a packet data destination in accordance with multiple embodiments of the present invention.

FIG. 5 is a logic flow diagram of functionality performed by a packet data destination in accordance with multiple embodiments of the present invention. Logic flow 500 begins (502) with the packet data destination receiving (504) a flow of packets for a packet data service instance from a packet data source and forwarding (506) packets from the flow to a target unit. At some point in time, while the packet data destination is receiving and forwarding packets, the packet data destination determines (508) that it is unable to successfully forward packets to the target unit due to some condition and/or event. In response, the packet data destination transmits (510) to the source an indication to suspend transmitting the flow of packets for the packet data service instance and an indication of how to process packets while the flow transmission is suspended. By indicating how to process the packets, the packet data source can more effectively manage the packets on behalf of the packet data destination until the flow transmission is resumed. Thus, logic flow 500 ends (512).

Figure 6:
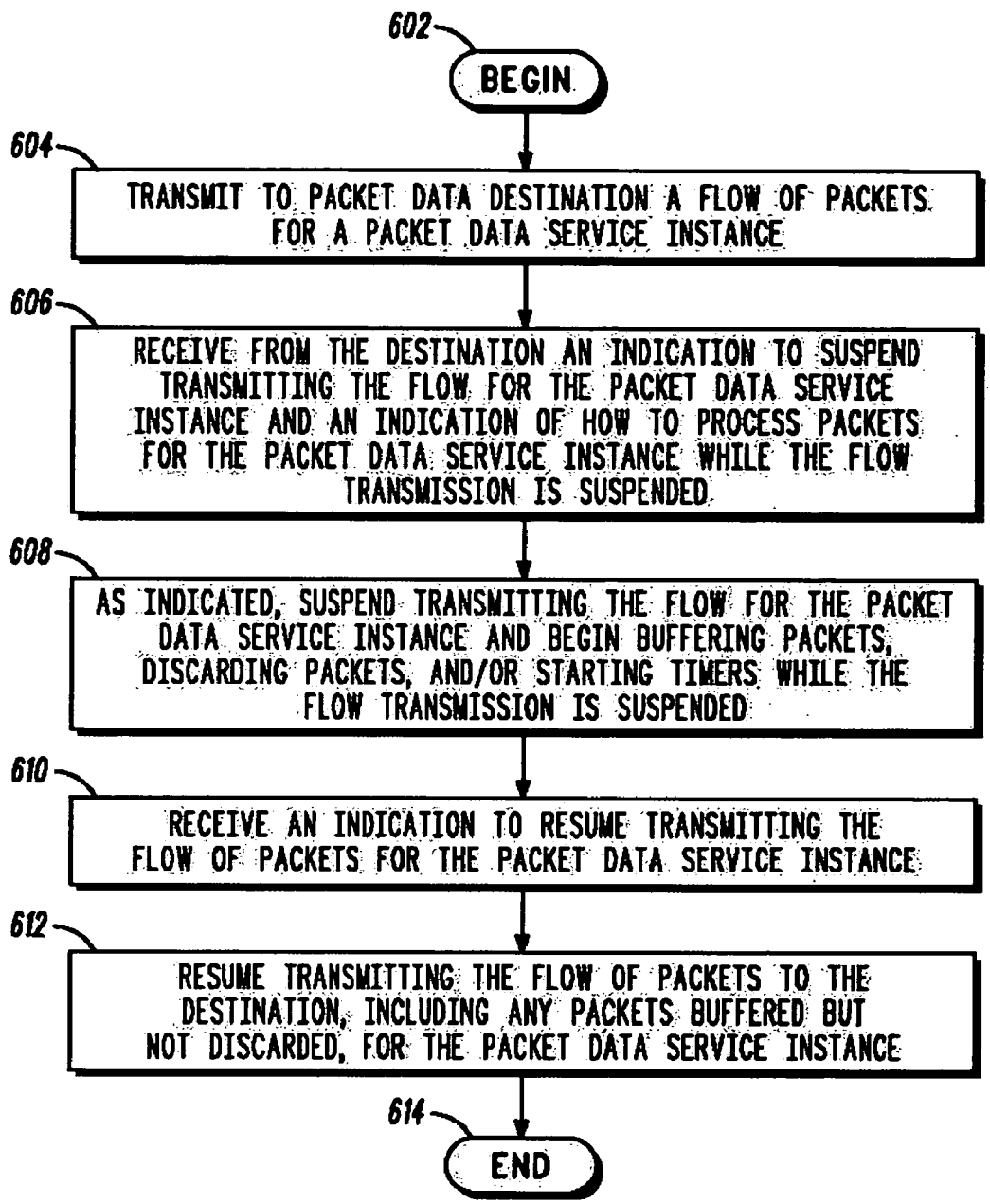
FIG. 6 is a logic flow diagram of functionality performed by a packet data source in accordance with multiple embodiments of the present invention.

FIG. 6 is a logic flow diagram of functionality performed by a packet data source in accordance with multiple embodiments of the present invention. Logic flow 600 begins (602) with the packet data source transmitting (604) a flow of packets for a packet data service instance to a packet data destination. At some point in time, the packet data source receives (606) from the packet data destination an indication to suspend transmitting the flow of packets for the packet data service instance and an indication of how to process packets while the flow transmission is suspended. As indicated by the destination, the packet data source suspends (608) transmitting the flow for the packet data service instance and, while the flow transmission is suspended, begins buffering packets, discarding packets, and/or starting the appropriate timers. Later, after the source subsequently receives (610) an indication to resume transmitting the flow of packets (or after a transmit suspend timer expires), the packet data source then resumes (612) transmitting the flow of packets to the destination, including any packets buffered but not discarded, for the packet data service instance. Thus, logic flow 600 ends (614).

In the foregoing specification, the present invention has been described with reference to specific embodiments. However, one of ordinary skill in the art will appreciate that various modifications and changes may be made without departing from the spirit and scope of the present invention as set forth in the appended claims. For example, although a PDSN and a RAN are described throughout as representing a packet data source and destination, respectively, the present invention is not limited to this particular system architecture. A packet data source could instead be represented by system components such as, but not limited to, a RAN, a PCF, a BS, or other such analogous components in wireless systems of other technologies. In addition, a packet data destination could instead be represented by system components such as, but not limited to, a PCF, a BS, an MS, or other such analogous components in wireless systems of other technologies. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or as having, as used herein, are defined as comprising (i.e., open language). The term coupled, as used herein, is defined as connected, although not necessarily directly, and not necessarily mechanically.

What is claimed is:

1. A method for managing packet data loss in a wireless network comprising;
   receiving, by a packet data destination from a packet data source, a flow of packets for a packet data service instance;
   transmitting, by the packet data destination to the packet data source, an indication to suspend transmitting the flow of packets for the packet data service instance; and
   transmitting, by the packet data destination to the packet data source, an indication of how to process packets for the packet data service instance while the flow transmission is suspended,
   wherein the indication of how to process packet s comprises signaling that provides packet processing instructions for the packet data source,
   wherein the packet processing instructions for the packet data source comprise an instruction from the group consisting of an instruction to buffer packets for the packet data service instance while the flow transmission is suspended, an instruction to buffer packets for the packet data service instance for an indicated period of time while the flow transmission is suspended, an instruction to discard packets for the packet data service instance while the flow transmission is suspended, and an instruction to resume flow transmission for the packet data service instance after an indicated period of time.

2. The method of claim 1, further comprising:
   forwarding, by the packet data destination to a target unit, packets from the flow of packets; and
   determining, by the packet data destination, that the packet data destination is no longer able to successfully forward packets from the flow of packets to the target unit,
   wherein transmitting the indication to suspend comprises transmitting the indication to suspend in response to determining that the packet data destination is no longer able to successfully forward packets from the flow of packets to the target unit and
   wherein transmitting the indication of how to process packets comprises transmitting the indication of how to process packets in response to determining that the packet data destination is no longer able to successfully forward packets from the flow of packets to the target unit.

3. The method of claim 2, wherein determining that the packet data destination is no longer able to successfully forward packets from the flow of packets to the target unit comprises determining that a condition is present from the group consisting of a buffer overflow condition within the packet data destination, a handoff in-progress condition, a packet data paging failure condition, and a preemption of packet data service by a circuit service condition.

4. The method of claim 1, wherein the indication to suspend transmitting the flow of packets comprises signaling that includes a flow control indication of transmit off (XOFF).

5. The method of claim 1, wherein the indication of how to process packets comprises signaling that indicates a condition is present at the packet data destination.

6. The method of claim 5, wherein the condition indicated comprises a condition from the group consisting of a buffer-overflow-discard-packets condition, a packet-data-paging-failure-discard-packets condition, a Voice Precedence Over Packet (VPOP) condition, a 1xEV-DO Circuit Services Notification condition, a preemption of packet data service by a circuit service condition, a buffer-overflow-hold-packets condition, a handoff in-progress condition, and a packet-data-paging-failure-hold-packets condition.

7. The method of claim 1, wherein the indication of how to process packets comprises signaling that indicates a timer value for a packet data source buffering period.

8. The method of claim 1, wherein the indication of how to process packets comprises signaling that indicates a timer value for a packet data source transmission suspension period.

9. A method for managing packet data loss in a wireless network comprising:
   transmitting, by a packet data source to a packet data destination, a flow of packets for a packet data service instance;
   receiving, by the packet data source from the packet data destination, an indication to suspend transmitting the flow of packets for the packet data service instance;
   receiving, by the packet data source from the packet data destination, an indication of how to process packets for the packet data service instance while the flow transmission is suspended;
   suspending, by the packet data source, transmission of the flow of packets for the packet data service instance to the packet data destination, in response to the indication to suspend; and
   processing, by the packet data source, packets for the packet data service instance while the flow transmission is suspended in accordance with the indication of how to process packets.

10. The method of claim 9, wherein the indication to suspend transmitting the flow of packets comprises signaling that includes a flow control indication of transmit off (XOFF).

11. The method of claim 9, wherein the indication of how to process packets comprises signaling that indicates a condition is present at the packet data destination.

12. The method of claim 11, wherein processing packets for the packet data service instance while the flow transmission is suspended comprises discarding packets for the packet data service instance when the condition indicated comprises a condition from the group consisting of a buffer-overflow-discard-packets condition, a packet-data-paging-failure-discard-packets condition, a Voice Precedence Over Packet (VPOP) condition, a 1xEV-DO Circuit Services Notification condition, and a preemption of packet data service by a circuit service condition.

13. The method of claim 11, wherein processing packets for the packet data service instance while the flow transmission is suspended comprises buffering packets for the packet data service instance when the condition indicated comprises a condition from the group consisting of a buffer-overflow-hold-packets condition, a handoff in-progress condition, and a packet-data-paging-failure-hold-packets condition.

14. The method of claim 9,
   wherein the indication of how to process packets comprises signaling that indicates a timer value for a packet data source buffering period and
   wherein processing packets for the packet data service instance while the flow transmission is suspended comprises buffering packets for the packet data service instance for a period of time defined by the timer value.

15. The method of claim 9,
   wherein the indication of how to process packets comprises signaling that indicates a timer value for a packet data source transmission suspension period,
   wherein processing packets for the packet data service instance while the flow transmission is suspended comprises buffering packets for the packet data service instance for a period of time defined by the timer value, and
   wherein the method of claim 11 further comprises resuming, by the packet data source to the packet data destination, transmission of the flow of packets, including packets buffered, for the packet data service instance at the end of the period of time defined by the timer value.

16. The method of claim 9, wherein processing packets for the packet data service instance while the flow transmission is suspended comprises:
   buffering packets for the packet data service instance while a buffer timer runs;
   discarding the packets that have been buffered upon the buffer timer expiration.

17. The method of claim 9, wherein the indication of how to process packets comprises signaling that provides packet processing instructions for the packet data source, wherein the packet processing instructions for the packet data source comprise an instruction from the group consisting of an instruction to buffer packets for the packet data service instance while the flow transmission is suspended, an instruction to buffer packets for the packet data service instance for an indicated period of time while the flow transmission is suspended, an instruction to discard packet s for the packet data service instance while the flow transmission is suspended, and an instruction to resume flow transmission for the packet data service instance after an indicated period of time.

18. The method of claim 9, wherein processing packets for the packet data service instance while the flow transmission is suspended comprises:
   discarding packets for the packet data service instance;
   preventing the counting of the discarded packets for user payment purposes.

19. The method of claim 9, wherein processing packets for the packet data service instance while the flow transmission is suspended comprises buffering packets for the packet data service instance and wherein the method of claim 9 further comprises:
   receiving, by the packet data source, an indication to resume transmitting the flow of packets for the packet data service instance, and
   resuming, by the packet data source to the packet data destination, transmission of the flow of packets, including packets buffered, for the packet data service instance in response to the indication to resume, wherein the indication to resume transmitting the flow of packet s comprises signaling from the group consisting of signaling that includes a flow control indication of transmit on (XON) and signaling that indicates a handoff has completed.

20. A packet data destination node for managing packet data loss in a wireless network, the packet data destination node comprising:
   a network interface configured to send and receive messaging using at least one communication protocol;
   a processor, communicatively coupled to the network interface,
      configured to receive, from a packet data source via the network interface, a flow of packets for a packet data service instance,
      configured to transmit, to the packet data source via the network interface, an indication to suspend transmitting the flow of packets for the packet data service instance, and configured to transmit, to the packet data source via the network interface, an indication of how to process packets for the packet data service instance while the flow transmission is suspended, wherein the indication of how to process packets comprises signaling that provides packet processing instructions for the packet data source, wherein the packet processing instructions for the packet data source comprise an instruction from the group consisting of an instruction to buffer packets for the packet data service instance while the flow transmission is suspended, an instruction to buffer packets for the packet data service instance for an indicated period of time while the flow transmission is suspended, an instruction to discard packets for the packet data service instance while the flow transmission is suspended, and an instruction to resume flow transmission for the packet data service instance after an indicated period of time.

21. The packet data destination node of claim 20, wherein the packet data destination node comprises a system component from the group consisting of a radio access network (RAN), a packet control function (PCF), a base station (BS), and a mobile station (MS).

22. The packet data destination node of claim 20, wherein the indication to suspend transmitting the flow of packets comprises signaling that includes a flow control indication of transmit off (XOFF), wherein the indication of how to process packets comprises signaling that provides packet processing instructions for the packet data source, and wherein the packet processing instructions for the packet data source comprise an instruction from the group consisting of an instruction to buffer packets for the packet data service instance while the flow transmission is suspended, an instruction to buffer packets for the packet data service instance for an indicated period of time while the flow transmission is suspended, an instruction to discard packets for the packet data service instance while the flow transmission is suspended, and an instruction to resume flow transmission for the packet data service instance after an indicated period of time.

23. A packet data source node for managing packet data loss in a wireless network, the packet data source node comprising:

a network interface configured to send and receive messaging using at least one communication protocol;

a processor, communicatively coupled to the network interface, configured to transmit, to a packet data destination via the network interface, a flow of packets for a packet data service instance, configured to receive, from the packet data destination via the network interface, an indication to suspend transmitting the flow of packets for the packet data service instance, configured to receive, from the packet data destination via the network interface, an indication of how to process packets for the packet data service instance while the flow transmission is suspended, configured to suspend transmission of the flow of packets for the packet data service instance to the packet data destination, in response to the indication to suspend, and configured to process packets for the packet data service instance while the flow transmission is suspended in accordance with the indication of how to process packets.

24. The packet data source node of claim 23, wherein the packet data source node comprises a system component from the group consisting of a packet data serving node (PDSN), a radio access network (RAN), a packet control function (PCF), and a base station (BS).

25. The packet data source node of claim 23, wherein the indication to suspend transmitting the flow of packets comprises signaling that includes a flow control indication of transmit off (XOFF), wherein the indication of how to process packets comprises signaling that provides packet processing instructions for the packet data source, and wherein the packet processing instructions for the packet data source comprise an instruction from the group consisting of an instruction to buffer packets for the packet data service instance while the flow transmission is suspended, an instruction to buffer packets for the packet data service instance for an indicated period of time while the flow transmission is suspended, an instruction to discard packets for the packet data service instance while the flow transmission is suspended, and an instruction to resume flow transmission for the packet data service instance after an indicated period of time.

* * * * *